US005394697A

United States Patent [19]

Hirata

[11] Patent Number: 5,394,697

[45] Date of Patent: Mar. 7, 1995

[54] HYDRAULIC DRIVE SYSTEM

[75] Inventor: Toichi Hirata, Ushiku, Japan

[73] Assignee: Hitachi Construction Machinery Co., Ltd., Tokyo, Japan

[21] Appl. No.: 130,906

[22] Filed: Oct. 4, 1993

[30] Foreign Application Priority Data

Mar. 9, 1992 [JP] Japan .................... 4-050765

[51] Int. Cl.[6] .................... F16D 31/02

[52] U.S. Cl. .................... 60/426; 60/452; 60/468; 91/517

[58] Field of Search .................... 60/420, 222, 426, 485, 60/452, 468, 494; 91/508, 517, 518, 461, 459

[56] References Cited

U.S. PATENT DOCUMENTS

| | | | |
|---|---|---|---|
| 4,694,647 | 9/1987 | Yoshida | 60/442 |
| 4,884,402 | 12/1989 | Strenzke et al. | 91/517 X |
| 4,977,928 | 12/1990 | Smith et al. . | |

FOREIGN PATENT DOCUMENTS

| | | | |
|---|---|---|---|
| 0065304 | 11/1982 | European Pat. Off. | 60/452 |
| 0154501 | 9/1982 | Japan | 60/452 |
| 60-11706 | 1/1985 | Japan . | |
| 1110883 | 4/1989 | Japan | 60/452 |
| 1-25921 | 5/1989 | Japan . | |
| 1-312201 | 12/1989 | Japan . | |
| 2275101 | 11/1990 | Japan | 60/422 |
| 3-74607 | 3/1991 | Japan . | |
| 3-125001 | 5/1991 | Japan . | |
| 2123988 | 2/1984 | United Kingdom | 60/452 |
| 90/10795 | 9/1990 | WIPO . | |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

An unloading valve is connected to a hydraulic pump, the unloading valve being opened when a differential pressure between a delivery pressure of the hydraulic pump and a maximum load pressure exceeds a predetermined value, for discharging a part of a flow rate of a hydraulic fluid delivered from the hydraulic pump to a reservoir. A fixed restriction for generating a control pressure corresponding to the flow rate of the hydraulic fluid discharged through the unloading valve is connected downstream of the unloading valve. A control device for the hydraulic pump is constructed to reduce the delivery rate of the hydraulic pump as the control pressure generated by the fixed restriction is raised, and increase the pump delivery rate as the control pressure is lowered. An adjusting valve is connected to the hydraulic pump in parallel to the unloading valve at a position upstream of the fixed restriction, and this adjusting valve is controlled such that an opening area of the adjusting valve is large when an input amount of a control lever is small, and the opening area is reduced as the input amount of the control lever increases. Thus, LS control through the unloading valve and bleed-off control through the adjusting valve are selectively performed depending on the input amount of the control lever, so that flow rate control can be implemented by utilizing characteristics of both the control modes.

10 Claims, 13 Drawing Sheets

HYDRAULIC DRIVE SYSTEM

TECHNICAL FIELD

The present invention relates to a hydraulic drive system equipped on hydraulic machines such as hydraulic excavators, and more particularly to a hydraulic drive system which includes a variable displacement hydraulic pump and controls a delivery rate of the hydraulic pump depending on a demanded flow rate.

BACKGROUND ART

As a hydraulic drive system for controlling a delivery rate of a hydraulic pump depending on a demanded flow rate, there is known the so-called load sensing control (hereinafter referred to as LS control) in which the delivery rate of the hydraulic pump is controlled in response to a differential pressure between a delivery pressure of the hydraulic pump and a maximum load pressure among a plurality of actuators, as disclosed in JP, B, 60-11706 and JP, A, 1-312201, for example. Such an LS system comprises a variable displacement hydraulic pump, a plurality of actuators connected to the hydraulic pump in parallel and driven by a hydraulic fluid delivered from the hydraulic pump, a plurality of flow control valves provided respectively between the hydraulic pump and the plurality of actuators for controlling respective flow rates of the hydraulic fluid supplied to the actuators, a control lever unit having a plurality of control levers for respectively controlling operation of the plurality of actuators, a pressure sensor for detecting a maximum load pressure among the plurality of actuators, and a pump controller for controlling a delivery pressure of the hydraulic pump to be held higher than the maximum load pressure by a fixed value (i.e., a target LS differential pressure).

When any one of the control levers is operated, the associated flow control valve is opened at an opening corresponding to its input amount or stroke (i.e., a demanded flow rate), whereupon the hydraulic fluid from the hydraulic pump is supplied to the associated hydraulic actuator through that flow control valve. Simultaneously, a load pressure of that hydraulic actuator is detected as the maximum load pressure by the pressure sensor, and the detected maximum load pressure acts on the pump controller which controls a delivery rate of the hydraulic pump so that the pump delivery pressure is held higher than the maximum load pressure by the fixed value. In the above process, when the input amount of the control lever (i.e., the demanded flow rate) is small, the opening of the flow control valve is also small and so is the flow rate of the hydraulic fluid passing through the flow control valve. Therefore, the pump delivery pressure can be held higher than the maximum load pressure by the fixed value with the small pump delivery rate. When the input amount of the control lever (i.e., the demanded flow rate) is increased, the opening of the flow control valve is also increased and so is the flow rate of the hydraulic fluid passing through the flow control valve. Therefore, a larger pump delivery rate is required to hold the pump delivery pressure higher than the maximum load pressure by the fixed value. As a result, the pump delivery rate is increased to maintain the fixed value.

Thus, in the LS control system, the pump controller is operated in response to a differential pressure between the pump delivery pressure and the maximum load pressure (i.e., an LS differential pressure), and the pump delivery rate is controlled depending on the demanded flow rate. Also, because the LS differential pressure is kept constant even with the load pressure of any actuator fluctuating, the differential pressure across the associated flow control valve is also kept constant, whereby the flow rate supplied to that actuator is held at a fixed value corresponding to an opening area of the flow control valve (i.e., the input amount of the control lever). In other words, the actuator is driven at a speed corresponding to the input amount of the control lever without being affected by fluctuations in the load pressure.

The pump controller for the LS control system has been designed with various constructions. Generally, as disclosed in JP, B, 60-11706, the pump controller comprises an adjusting valve operated in response to the LS differential pressure, and an actuator driven by the hydraulic fluid supplied through the adjusting valve for operating a swash plate of the hydraulic pump.

Also, the prior art disclosed in JP, A, 1-312201 adopts a pump controller comprising an unloading valve operated in response to the differential pressure between the delivery pressure of the hydraulic pump and the maximum load pressure such that it is opened when the differential pressure exceeds a predetermined value for discharging a part of the delivery rate supplied from the hydraulic pump to a reservoir, a resisting device provided downstream of the unloading valve for generating a control pressure corresponding to the flow rate of the hydraulic fluid discharged from the unloading valve, and a negative regulator for reducing the delivery rate of the hydraulic pump as the control pressure generated by the resisting device becomes higher, and increasing the pump delivery rate as the generated control pressure becomes lower. In this pump controller, when the delivery rate of the hydraulic pump is smaller than the demanded flow rate, the pump delivery pressure does not rise so that the differential pressure between the pump delivery pressure and the maximum load pressure, i.e., the LS differential pressure, becomes smaller than the predetermined value, thereby closing the unloading valve. Accordingly, the control pressure generated by the resisting device is lowered and the pump delivery rate is controlled to increase. When the delivery rate of the hydraulic pump is increased above the demanded flow rate, the pump delivery pressure rises so that the LS differential pressure becomes larger than the predetermined value, thereby opening the unloading valve. Accordingly, the control pressure generated by the resisting device is raised and the pump delivery rate is controlled to decrease. Thus, with this prior art, the pump delivery rate is controlled so that the pump delivery pressure is held higher than the maximum load pressure by a fixed value.

Meanwhile, as another type of hydraulic drive system for controlling a delivery rate of a hydraulic pump depending on a demanded flow rate, there is known a control system in which the opening area of a center bypass of a center-open flow control valve is reduced depending on an input amount of the control lever to thereby control the pump delivery rate and the flow rate supplied to the actuator, as disclosed in JP, A, 1-25921, for example. In this case, the actuator is supplied via the flow control valve with the hydraulic fluid at a flow rate resulted by subtracting a bleed rate through the center bypass from the delivery rate of the hydraulic pump. The control effected by this system is called bleed-off control.

DISCLOSURE OF THE INVENTION

However, the above conventional systems are accompanied by the following problems.

In the LS control system, when the associated control level is operated for driving any actuator, the delivery pressure of the hydraulic pump is momentarily raised up to a pressure higher than the load pressure of the actuator by a fixed value regardless of the input amount of the control lever, causing the flow control valve to produce a differential pressure across it corresponding to the fixed value. As soon as the control lever is operated, therefore, the hydraulic fluid is supplied to the flow control valve at a flow rate depending on the opening area of the flow control valve and the differential pressure across the same. On the other hand, since a working member to be driven by the actuator has inertia, the actuator cannot start moving at once. Accordingly, the drive pressure of the actuator is momentarily raised up to or near a maximum pressure set by a relief valve, and the actuator is forced to abruptly speed up with the resulting higher pressure. Also, even while the actuator is being driven, an increase in the load momentarily raises both the pump delivery pressure and the actuator drive pressure, whereupon a large drive force is produced on the actuator.

Meanwhile, in construction machines such as hydraulic excavators, when an-operator manipulates the control lever through a half stroke or less, it is often desired to perform control of the type that not only an actuator speed, but also an acceleration and a drive force of the actuator at the start-up can be made small. With the foregoing conventional systems, however, because the actuator drive pressure cannot be controlled as mentioned above, a large acceleration and drive force are produced on the actuator even when the control lever is operated through a half stroke or less. Accordingly, it is advantageous in such a case that the acceleration and the drive force of the actuator can be controlled depending on the input amount of the control lever.

In general, when the control lever is quickly operated through a half stroke for starting up the actuator, or when it is quickly returned from the full-stroke position to the half-stroke position, the actuator generates vibration due to the abrupt change in the actuator speed. Studies conducted by the inventors indicate that if the flow rate supplied to the actuator is constant regardless of the actuator pressure, the vibration once generated on the actuator will not damp. To damp the vibration once generated, the system is required to have such a characteristic that the flow rate supplied to the actuator is reduced when the actuator pressure increases. In the foregoing conventional LS control system, however, even when the circuit pressure is raised upon occurrence of the vibration in the actuator, the delivery rate of the hydraulic pump is kept constant under the LS control to continue supplying the hydraulic fluid to the actuator at a constant flow rate, resulting in that the vibration once generated in the actuator is hard to damp.

On the other hand, in the bleed-off control system, because of the actuator being supplied with the hydraulic fluid at a flow rate resulted by subtracting the bleed rate through the center bypass from the delivery rate of the hydraulic pump, if the load pressure of the actuator is fluctuated, the bleed rate through the center bypass is also fluctuated and so is the flow rate supplied to the actuator. Therefore, even with the same input amount of the control lever, fluctuations in the load pressure cause the flow rate supplied to the actuator and hence change the actuator drive speed. Thus, the bleed-off control has a drawback that the drive speed cannot be controlled precisely depending on the input amount of the control lever.

A main object of the present invention is to provide a hydraulic drive system in which the LS control and the bleed-off control are selectively performed depending on an input amount of a manipulator means, so that flow rate control can be implemented by utilizing characteristics of both the control modes.

Another object of the present invention is to provide a hydraulic drive system in which when an input amount of the manipulator means is in a particular range, an acceleration and a drive force of an actuator can be controlled depending on the input amount of the manipulator means and an ability of damping vibration of the actuator is improved, and when the input amount of the manipulator means is in another range, an actuator speed can be controlled precisely depending on the input amount of the manipulator means.

To achieve the above objects, according to the present invention, there is provided a hydraulic drive system comprising a variable displacement hydraulic pump and a plurality of actuators driven by a hydraulic fluid delivered from said hydraulic pump. Manipulator means manipulated by an operator are provided for commanding operation of said plurality of actuators, while a plurality of flow control valves control respective flow rates of the hydraulic fluid supplied to said plurality of actuators. Pressure sensor means for detect a maximum load pressure among said plurality of actuators, and an unloading valve, which is opened when a differential pressure between a delivery pressure of said hydraulic pump and said maximum load pressure exceeds a predetermined value, discharges a part of a flow rate of the hydraulic fluid delivered from said hydraulic pump to a reservoir. Moreover, resisting means provided downstream of said unloading valve generate a control pressure corresponding to the flow rate of the hydraulic fluid discharged through said unloading valve, and pump control means are provided for reducing the delivery rate of said hydraulic pump as the control pressure generated by said resisting means is raised, and for increasing the pump delivery rate as the control pressure is lowered. Additionally, the hydraulic drive system further comprises adjusting valve means connected to said hydraulic pump in parallel to said unloading valve at a position upstream of said resisting means, and control means for controlling said adjusting valve means such that an opening area of said adjusting valve means is large when an input amount of said manipulator means is small, and the opening area of said adjusting valve means is reduced as the input amount of said manipulator means increases.

In the present invention thus constituted, the adjusting valve means the opening area of which is controlled depending on the input amount of the manipulator means as stated above, is provided in parallel to the unloading valve at a position upstream of the resisting means. Therefore, when the differential pressure between the delivery pressure of the hydraulic pump and the maximum load pressure (i.e., the LS differential pressure) is not larger than the predetermined value, the unloading valve is closed so that a part of the delivery rate of the hydraulic pump is discharged to the reservoir through the adjusting valve means only. When the LS differential pressure exceeds the predetermined value, a part of the delivery rate of the hydraulic pump is primarily discharged to the reservoir through the unloading valve.

In the mode where a part of the delivery rate of the hydraulic pump is discharged to the reservoir through the adjusting valve means only, since the discharging flow rate is reduced and the control pressure generated by the resisting means is lowered as the input amount of the manipulator means increases, the delivery rate of the hydraulic pump 1 is controlled to become larger as the input amount of the manipulator means increases. Thus, bleed-off control similar to that in a conventional system including a center-open flow control valve is performed through the adjusting valve means.

Meanwhile, in the mode where a part of the delivery rate of the hydraulic pump is primarily discharged to the reservoir through the unloading valve, the LS differential pressure is controlled to be held at a predetermined value set by the unloading valve and, therefore, LS control is performed through the unloading valve.

In that way, the LS control and the bleed-off control are selectively performed whether the LS differential pressure is less than the predetermined value or not. The LS differential pressure is changed depending on the delivery rate of the hydraulic pump, the opening area of the adjusting valve means, and the maximum load pressure. The delivery rate of the hydraulic pump and the opening area of the adjusting valve means are changed depending on the input amount of the manipulator means. Accordingly, depending on the input amount of the manipulator means, the LS control through the unloading valve and the bleed-off control through the adjusting valve means are selectively performed to enable flow rate control by utilizing characteristics of both the control modes.

In the bleed-off control, a part of the pump delivery rate is discharged to the reservoir through the adjusting valve means, and the opening area of the adjusting valve means is controlled depending on the input amount of the manipulator means such that the flow rate discharging to the reservoir through the adjusting valve means is reduced with the larger input amount of the manipulator means. As a result, an acceleration and a drive force of the actuator can be controlled depending on the input amount of the manipulator means, enabling work to be smoothly carried out with less shock.

Also, in the bleed-off control, as the load pressure of the actuator becomes higher, a part of the pump delivery rate which is discharged to the reservoir through the adjusting valve means is increased, while the flow rate distributed for supply to the actuator is reduced, whereby the control pressure generated by the resisting means rises and the pump delivery rate itself reduces. Thus, the system under the bleed-off control has such a characteristic that the flow rate supplied to the actuator is reduced when the load pressure of the actuator increases. Therefore, the vibration generated on the actuator is easily damped and the flow rate control can be performed in a stable manner without causing hunting.

On the other hand, in the LS control through the unloading valve, since the LS differential pressure is kept constant, it is possible to control an actuator speed precisely depending on the input amount of the manipulator means without being affected by the load pressure.

Consequently, when the input amount of the manipulator means is in a particular range and the bleed-off control is selected, an acceleration and a drive force of the actuator can be controlled depending on the input amount of the manipulator means and an ability of damping vibration of the actuator is improved. Further, when the input amount of the manipulator means is in another range and the LS control is selected, the actuator speed can be controlled precisely depending on the input amount of the manipulator means.

In the above hydraulic drive system, preferably, said adjusting valve means has an opening characteristic that the opening area is large when a valve stroke thereof is small, and the opening area is reduced as the valve stroke increases.

Also preferably, said manipulator means is of the electric type, outputs an electric command signal depending on the input amount thereof, and said control means comprises a controller for producing an electric drive signal corresponding to the electric command signal from said manipulator means and a proportional solenoid valve driven by the electric drive signal from said controller for generating a corresponding pilot pressure, whereby said adjusting valve means is driven by the pilot pressure from said proportional solenoid valve to change the opening area thereof.

The manipulator means may be of the hydraulic type generating a pilot pressure depending on the input amount thereof. In this case, the control means comprises a check valve for taking out the pilot pressure, whereby the adjusting valve means is driven by the pilot pressure taken out by the check valve to change the opening area thereof.

Preferably, said adjusting valve means comprises a single adjusting valve, and said control means controls said adjusting valve depending on the input amount of said manipulator means.

Said adjusting valve means may comprise a plurality of adjusting valves respectively associated with said plurality of actuators. In this case, said plurality of adjusting valves are directly connected to upstream of said resisting means, and said control means controls, depending on the input amounts of said manipulator means, said adjusting valves associated with said actuators which are commanded in operation from said manipulator means, respectively.

Preferably, said resisting means is a fixed restrictor. Said resisting means may be a combination of a fixed restrictor and a relief valve.

Furthermore, preferably, said pump control means comprises a pressure sensor for detecting the control pressure generated by said resisting means, a controller for receiving a signal from said pressure sensor, calculating a smaller target displacement volume as said control pressure is raised while calculating a larger target displacement volume as said control pressure is lowered, and outputting an electric drive signal corresponding to the calculated target displacement volume, and a regulator for controlling a displacement volume of said hydraulic pump in accordance with said electric drive signal.

BRIEF DESCRIPTION OF THE DRAWINGS

FIG. 10 is a graph showing a flow rate characteristic resulting from combining the flow rate characteristic of LS control and the flow rate characteristic of bleed-off control shown in FIG. 9; i.e.

FIG. 12 is a graph similar to FIG. 10, showing a combined flow rate characteristic of the two-type flow rate characteristics shown in FIG. 11; i.e.

BEST MODE FOR CARRYING OUT THE INVENTION

Embodiments of the present invention will be described hereinafter with reference to the drawings.

At the outset, a description will be given of a first embodiment of the present invention by referring to FIGS. 1 to 13.

Figure 1:
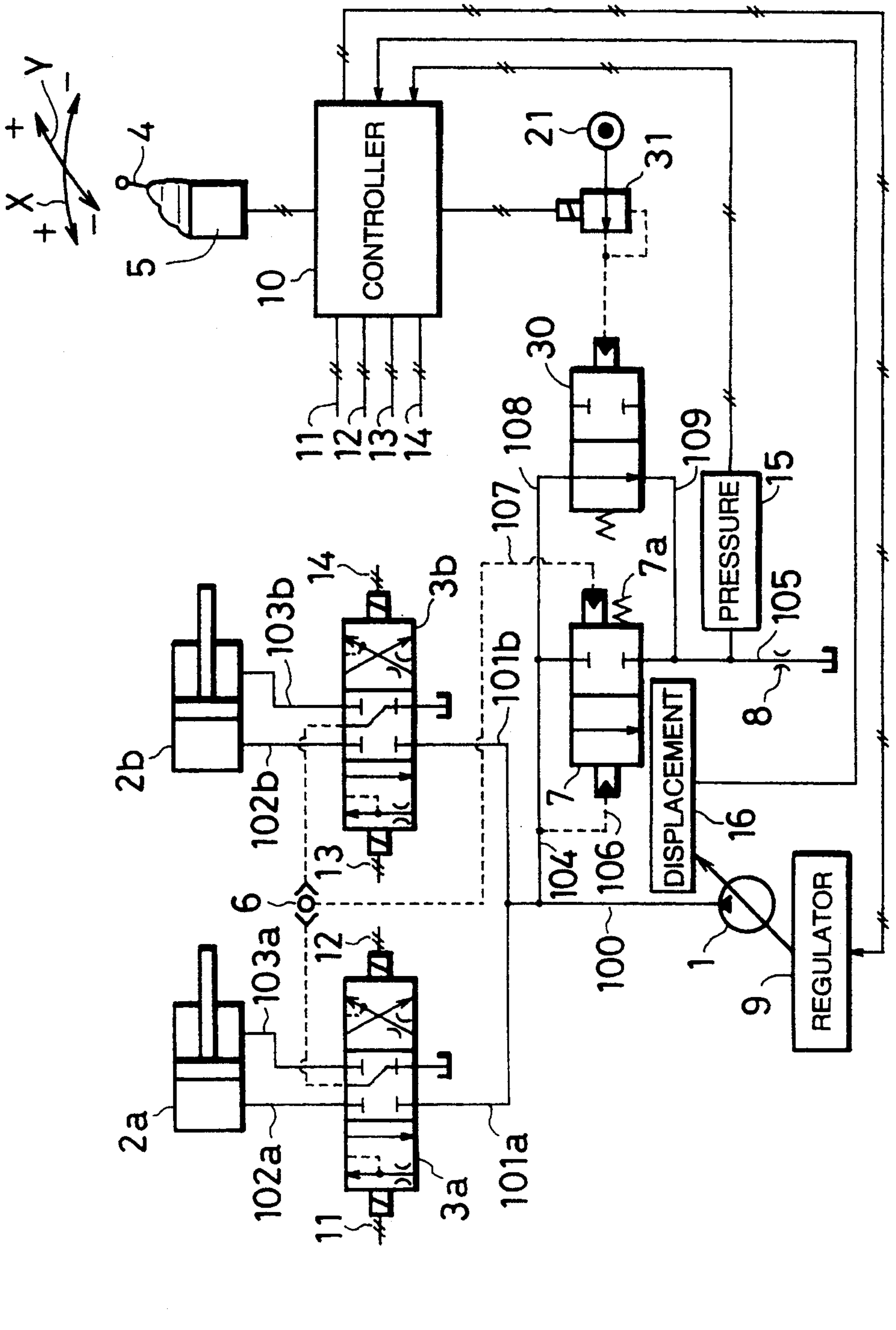
FIG. 1 is a schematic diagram showing a hydraulic drive system according to a first embodiment of the present invention.

In FIG. 1, a hydraulic drive system according to the first embodiment of the present invention comprises a variable displacement hydraulic pump 1, a plurality of actuators 2*a*, 2*b* connected to the hydraulic pump 1 in parallel through a supply line 100, supply lines 101*a*, 101*b* and actuator lines 102*a* or 103*a* and 102*b* or 103*b*, respectively, and driven by a hydraulic fluid delivered from the hydraulic pump 1, a plurality of flow control valves 3*a*, 3*b* disposed respectively between the hydraulic pump 1 and the actuators 2*a*, 2*b* for connection to the supply lines 101*a* and the actuator lines 102*a*, 103*a* and the supply lines 101*b* and the actuator lines 102*b*, 103*b* for controlling respective flow rates of the hydraulic fluid supplied to the actuators 2*a*, 2*b*, a control lever unit 5 having a control lever 4 for operating the flow control valves 3*a*, 3*b* to control driving of the actuators 2*a*, 2*b*, a pressure sensor, e.g., a shuttle valve 6, connected to the flow control valves 3*a*, 3*b* for detecting a maximum load pressure between the actuators 2*a* and 2*b*, an unloading valve 7 connected between a bleed line 104 branched from the supply line 100 and a bleed line 104 connected to a reservoir, the unloading valve 7 being also connected to the bleed line 104 and the shuttle valve 6 through respective pilot lines 106, 107 such that it is operated in response to a differential pressure between a delivery pressure of the hydraulic pump 1 and the maximum load pressure to be opened when the differential pressure exceeds a predetermined value set by a spring 7*a*, for thereby discharging a part of the delivery rate of the hydraulic fluid from the hydraulic pump 1 to the reservoir, a resisting device, e.g., a fixed restrictor 8, provided in the bleed line 105 downstream of the unloading valve 7 for generating a control pressure corresponding to the flow rate of the hydraulic fluid discharged through the unloading valve 7, and a regulator 9 for reducing the delivery rate of the hydraulic pump 1 as the control pressure generated by the fixed restrictor 8 is raised, and increasing the pump delivery rate as the control pressure is lowered.

When the hydraulic drive system of this embodiment is mounted on a hydraulic excavator, the actuators 2*a*, 2*b* are used as actuators for driving working members such as a boom and an arm, for example.

The control lever unit 5 is an electric control unit for outputting an electric command signal corresponding to an input amount of the control lever 4. For example, when the control lever 4 is operated in a direction of X as indicated, there produces an electric command signal for driving the actuator 2*a* in a direction corresponding to whether the control lever is operated in the positive (+) or negative (−) direction. When the control lever 4 is operated in a direction of Y perpendicular to the X-direction, there produces an electric command signal for driving the actuator 2*b* in a direction corresponding to whether the control lever is operated in the positive (+) or negative (−) direction. The electric command signal produced by the control lever unit 5 is input to a controller 10 comprising input and output sections and a processing section. The flow control valves 3*a*, 3*b* are solenoid-operated valves driven by electric drive signals which are output from the controller 10. These electric drive signals are respectively applied to solenoid drive sectors on both sides of the flow control valve 3*a* through lines 11, 12, and to solenoid drive sectors on both sides of the flow control valve 3*b* through lines 13, 14. Thus, when the control lever 4 is operated in the X-direction, the flow control valve 3*a* is shifted depending on both whether the control lever is operated in the positive or negative direction, and the input amount, i.e., the stroke through which the control lever is operated. Also, when the control lever 4 is operated in the Y-direction, the flow control valve 3*b* is shifted depending on both whether the control lever is operated in the positive or negative direction, and the input amount, i.e., the stroke through which the control lever is operated.

Figure 2:
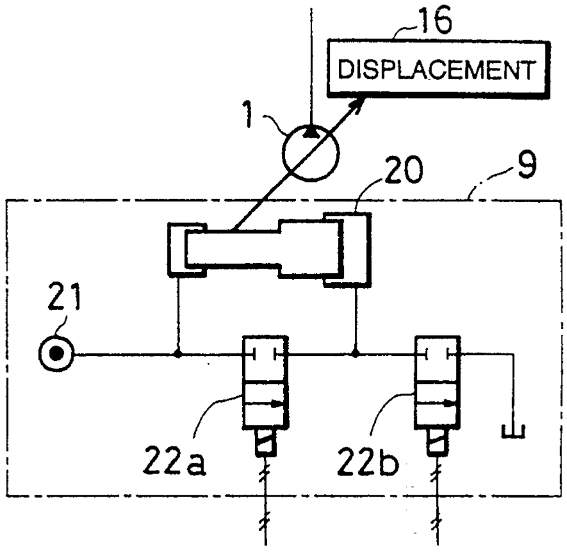
FIG. 2 is a diagram showing the detailed construction of a regulator shown in FIG. 1.

The regulator 9 comprises, as shown in FIG. 2, an actuator 20 for driving a swash plate of the hydraulic pump 1 to control its tilting angle (displacement volume), a pilot hydraulic source 21 in communication with a pressure receiving chamber on the small-diameter side of the actuator 20, a high-speed solenoid valve 22*a* disposed between the pressure receiving chamber on the small-diameter side and a pressure receiving chamber on the large-diameter side of the actuator 20, and a high-speed solenoid valve 22*b* disposed between the pressure receiving chamber on the large-diameter side of the actuator 20 and the reservoir. The high-speed solenoid valves 22*a*, 22*b* are subjected to on/off control by respective electric drive signals output from the controller 10 to their solenoid drive sectors. More specifically, each of the high-speed solenoid valves is in its closed position, as shown, when the electric drive signal is turned on, and shifted to its open position when the electric drive signal is turned off. With such valve shifting, when the high-speed solenoid valve 22*a* is open and the high-speed solenoid valve 22*b* is closed, a hydraulic fluid from the hydraulic source 21 flows into both pressure receiving chambers on the large-diameter and small-diameter sides of the actuator 20, so that the actuator 20 is moved to the left in the drawing due to an area difference between the two pressure receiving chambers. The tilting angle of the hydraulic pump 1 is thereby enlarged to increase the pump delivery rate. Conversely, when the high-speed solenoid valve 22*a* is closed and the high-speed solenoid valve 22*b* is open, the hydraulic fluid from the hydraulic source 21 flows into the pressure receiving chamber on the small-diameter side, while the hydraulic fluid in the pressure receiving chamber on the large-diameter side is discharged into the reservoir, so that the actuator 20 is moved to the right in the drawing. The tilting angle of the hydraulic pump 1 is thereby diminished to reduce the pump delivery rate. When the high-speed solenoid valves 22*a*, 22*b* are both closed, no hydraulic fluid flows into or out of both the pressure receiving chamber on the large-diameter and small-diameter sides, and the tilting angle of the hydraulic pump 1 remains as it is. In other words, the pump delivery rate is kept constant.

Returning to FIG. 1, a pressure sensor 15 is connected to the bleed line 105 at a position between the unloading valve 7 and the fixed restrictor 8 for detecting the control pressure generated upstream of the fixed restrictor 8, and a displacement sensor 16 is associated with the hydraulic pump 1 for detecting the tilting angle of the swash plate, signals from these sensors 15, 16 being input to the controller 10.

Further, an adjusting valve 30 is disposed in parallel to the unloading valve 7 and upstream of the fixed restrictor 8. More specifically, the adjusting valve 30 is connected between a bleed line 108 connected to the bleed line 104 and a bleed line 109 connected to the bleed line 105. The adjusting valve 30 is of a hydraulic pilot-operated valve and its opening area is changed depending on the input amount of the control lever 4. To this end, a proportional solenoid valve 31 is disposed between the aforesaid hydraulic source 21 and a hydraulic pilot-drive sector of the adjusting valve 30, and an electric drive signal from the controller 10 is applied to a solenoid drive sector of the proportional solenoid valve 31. The proportional solenoid valve 31 is driven by the electric drive signal from the controller 10 and produces a pilot pressure proportional to the electric drive signal, the pilot pressure being output to the hydraulic pilot-drive sector of the adjusting valve 30.

Figure 3:
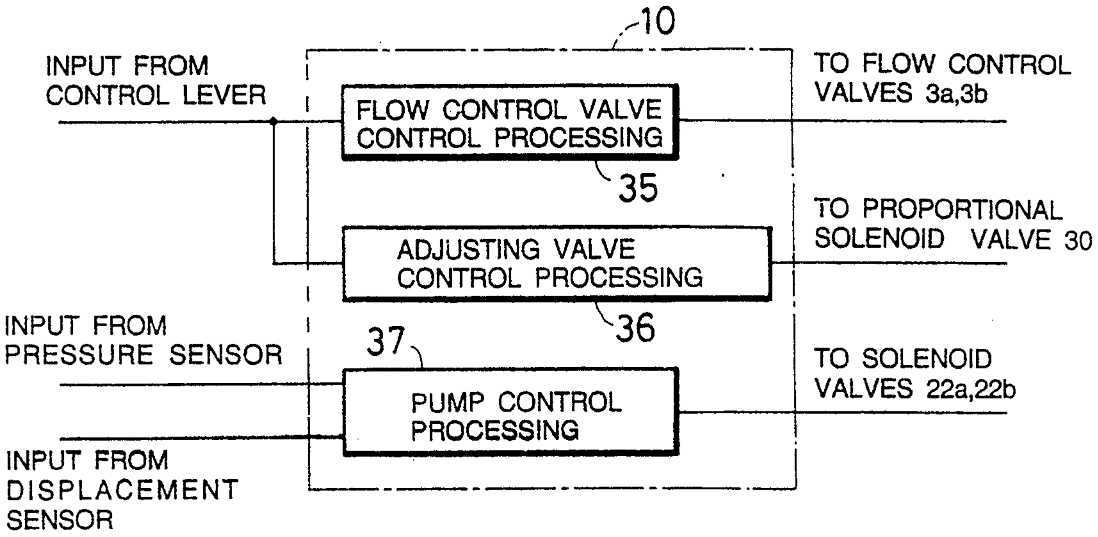
FIG. 3 is a block diagram showing control functions of a controller shown in FIG. 1.

Control functions of the controller 10 are shown in the block diagram of FIG. 3. The controller 10 has a control processing function 35 for producing the electric drive signal applied to the flow control valves 3*a*, 3*b*, a control processing function 36 for producing the electric drive signal applied to the adjusting valve 30, and a control processing function 37 for producing the electric drive signal applied to the regulator 9 for the hydraulic pump 1.

Figure 4:
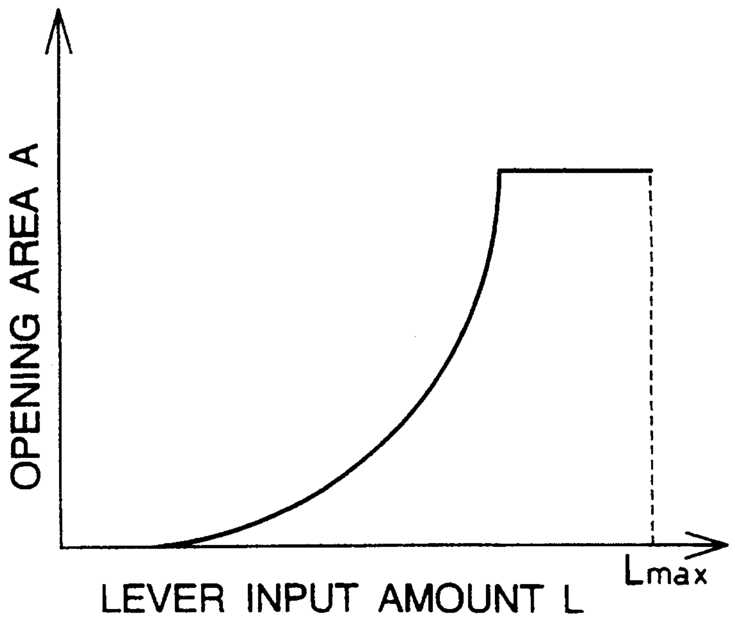
FIG. 4 is a graph showing the relationship of an opening area of a flow control valve shown in FIG. 1 versus an input amount of an associated control lever.

The control processing function 35 for the flow control valves 3*a*, 3*b* has been described above. FIG. 4 shows the relationship of an opening area A of a meter-in variable restrictor of each flow control valve 3*a*, 3*b* versus an input amount L of the control lever 4 in the electric lever unit 5. In the graph of FIG. 4, the input amount L of the control lever 4 represents the amount or stroke through which the control lever is operated in the positive or negative X-direction and in the positive or negative Y-direction. Also, Lmax represents a maximum input amount resulting when the control lever 4 is operated through its full stroke.

Figure 5:
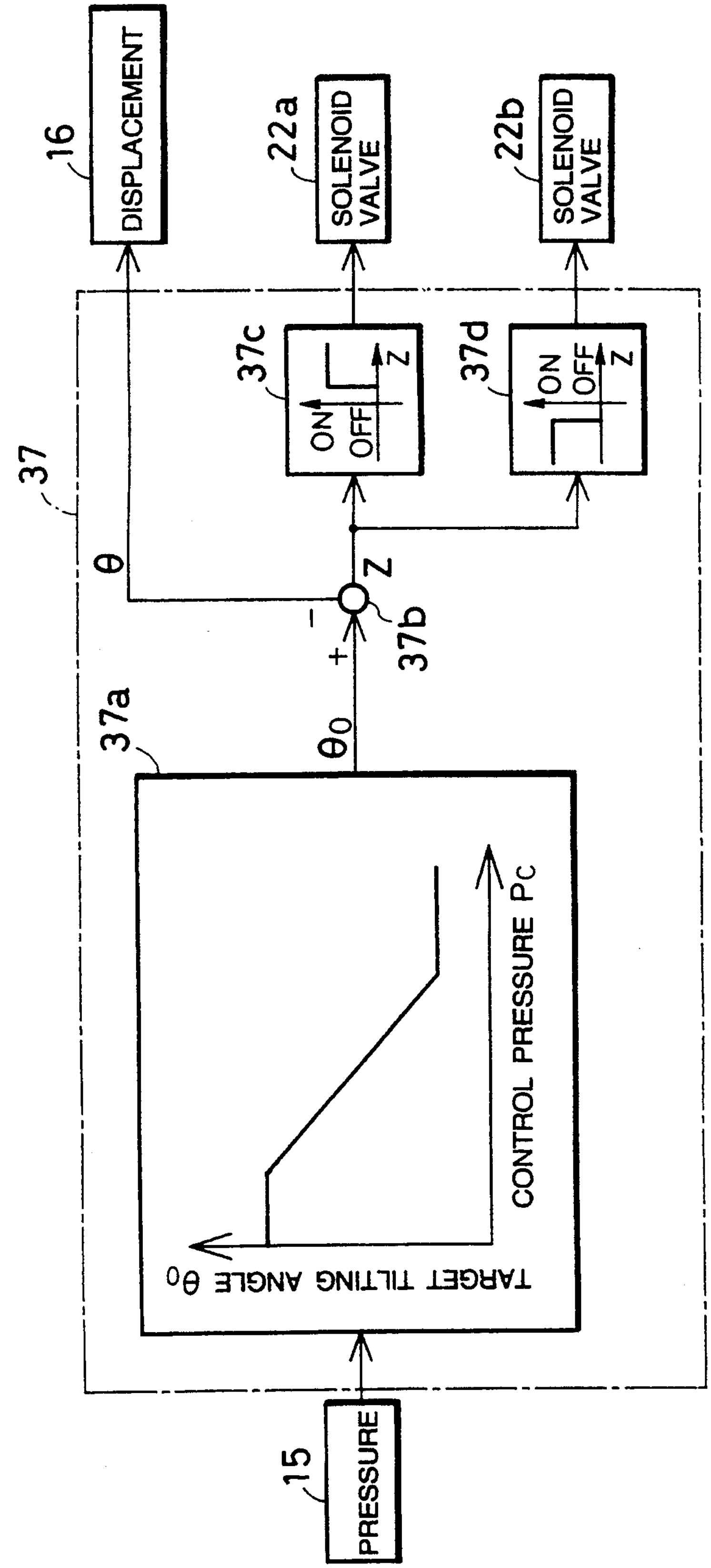
FIG. 5 is a block diagram showing details of a pump control processing function shown in FIG. 3

Details of the control processing function 37 for the hydraulic pump 1 are shown in FIG. 5. Referring to FIG. 5, in a block 37*a*, the-signal from the pressure sensor 15 is input to calculate a target tilting angle $\theta o$ corresponding to the control pressure Pc generated upstream of the fixed restrictor 8. This calculation is performed by previously setting the relationship between the control pressure Pc and the target tilting angle $\theta o$, and storing the relationship in the form of a function table. The stored relationship is, as seen from FIG. 5, such that the target tilting angle $\theta o$ becomes smaller as the control pressure Pc generated upstream of the fixed restrictor 8 is raised, and larger as the control pressure Pc is lowered. The target tilting angle $\theta o$ calculated by the block 37*a* is applied to an adder 37b which outputs a deviation Z of the target tilting angle $\theta o$ from a tilting angle $\theta$ of the swash plate of the hydraulic pump 1 which is detected by the displacement sensor 16 and fed back thereto. The deviation Z is converted into an on or off electric drive signal in blocks 37*c*, 37*d*. More specifically, when the deviation Z is positive, the on electric drive signal is output to the solenoid valve 22*a* and the off electric drive signal is output to the solenoid valve 22*b*. When the deviation Z is negative, the on electric drive signal is output to the solenoid valve 22*b* and the off electric drive signal is output to the solenoid valve 22*a*. The tilting angle of the hydraulic pump 1 is controlled, as mentioned above, by the on and off electric drive signals applied to the solenoid valves 22*a*, 22*b*. Thus, the actual tilting angle $\theta$ detected by the displacement sensor 16 is fed back for control such that the actual target tilting angle $\theta$ coincides with the target tilting angle $\theta o$.

The control processing function 37 for the hydraulic pump 1 and the regulator 9 cooperatively constitute pump control means for reducing the delivery rate of the hydraulic pump 1 as the control pressure generated by the fixed restrictor 8 is raised, and for increasing the pump delivery rate as the control pressure is lowered.

Figure 6:
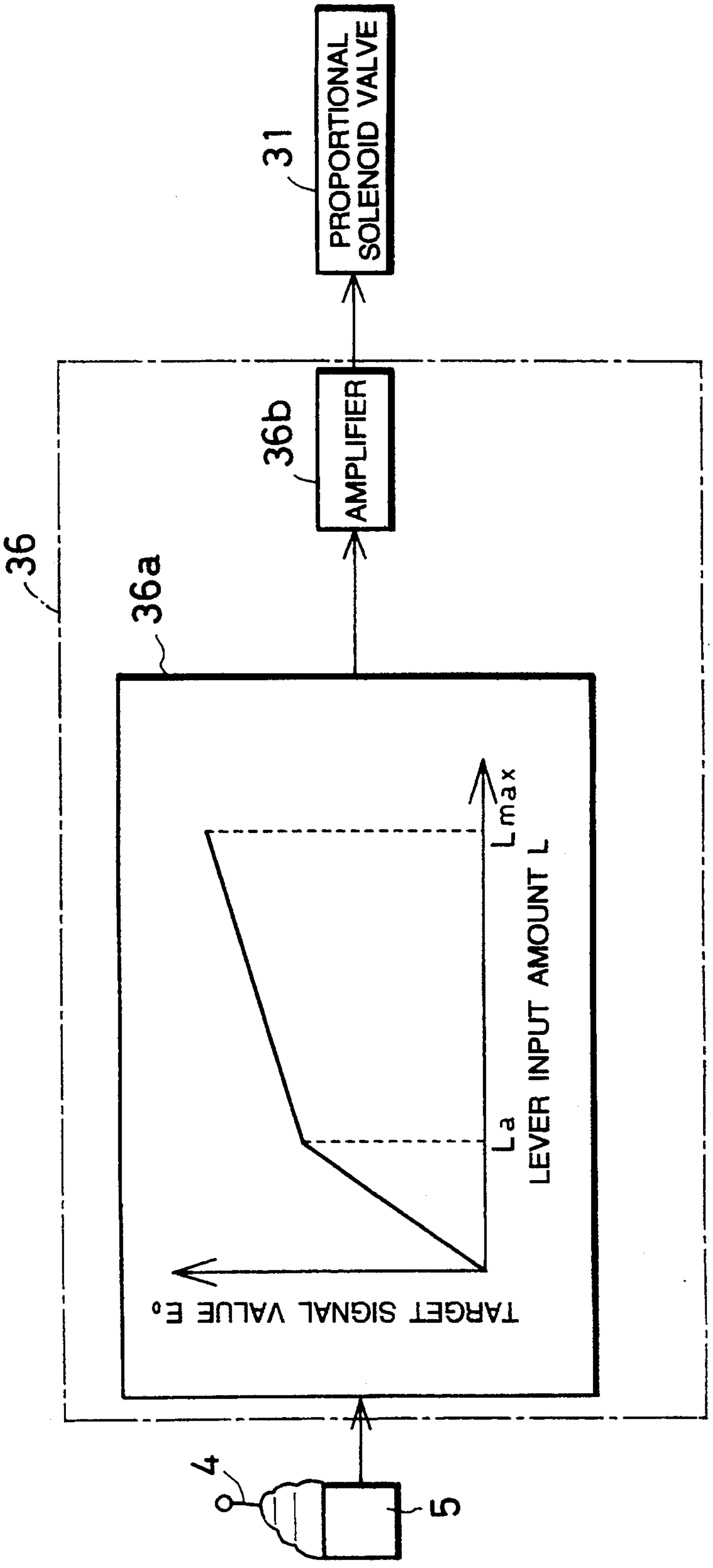
FIG. 6 is a block diagram showing details of an adjusting valve control processing function shown in FIG. 3.

Details of the control processing function 36 for the adjusting valve 30 are shown in FIG. 6. Referring to FIG. 6, in a block 36*a*, the electric signal from the electric lever unit 5 is input to calculate a target signal value Eo corresponding to the input amount L of the control lever 4. This calculation is performed by previously setting the relationship between the input amount L and the target signal value Eo, and storing the relationship in the form of a function table. The stored relationship is, as seen from FIG. 6, such that as the input amount L of the control lever increases, the target signal value Eo is also increased. Also, an increase rate of the target signal value Eo is reduced at and beyond a certain value La of the input amount L. The target signal value Eo calculated by the block 36*a* is amplified by an amplifier 36*b* and output as the electric drive signal to the proportional solenoid valve 31.

Figure 7:
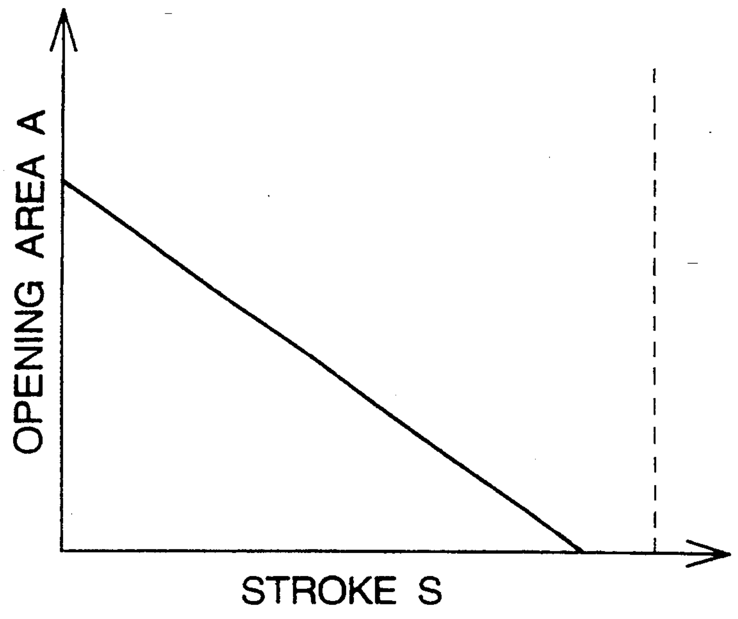
FIG. 7 is a graph showing the relationship of an opening area versus a stroke of an adjusting valve shown in FIG. 1.
Figure 8:
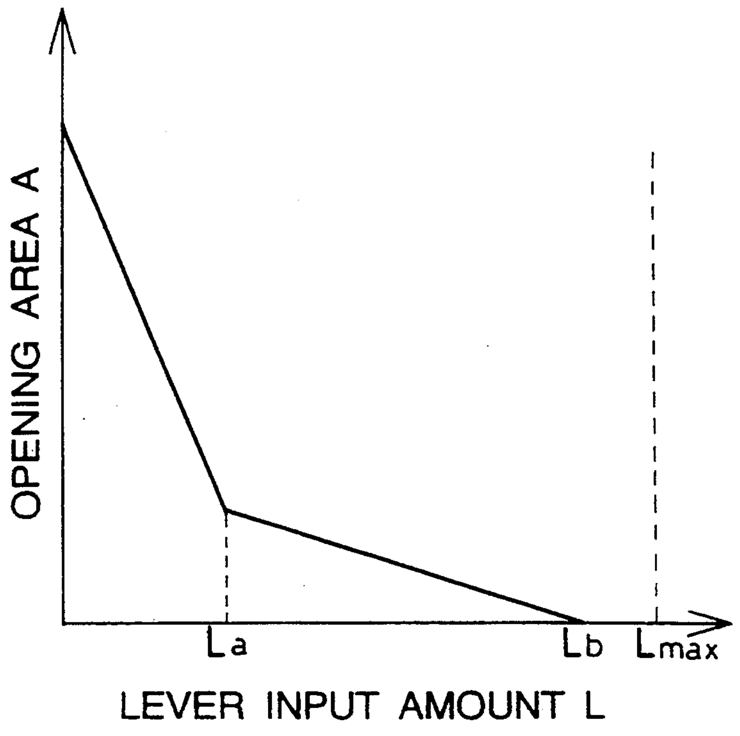
FIG. 8 is a graph showing the relationship of the opening area of the adjusting valve versus the input amount of the control lever.

The proportional solenoid valve 31 generates the pilot pressure proportional to the electric drive signal from the controller 10 and outputs it to the hydraulic pilot-drive sector of the adjusting valve 30. On the other hand, the relationship of an opening area A versus a stroke S of the adjusting valve 30 is shown in FIG. 7. Thus, as the valve stroke S increases, the opening area A is reduced. Accordingly, the relationship of the opening area A versus the input amount L of the control lever 4 in the adjusting valve 30, which is driven by the pilot pressure from the proportional solenoid valve 31, becomes as shown in FIG. 8. In other words, the adjusting valve 30 is controlled such that the opening area A is large when the input amount L of the control lever 4 is small, and it reduces as the input amount L is increased. Also, the opening area A of the adjusting valve 30*a* becomes zero at Lb before the input amount L reaches its maximum $L_{max}$. Thus, the adjusting valve 30 is fully closed prior to reaching the maximum input amount $L_{max}$.

As explained above, the control processing function 36 for the adjusting valve 30 and the proportional solenoid valve 31 cooperatively constitute control means for controlling the adjusting valve 30 in such a manner as to provide the large opening area of the adjusting valve 30 for a small input amount of the control lever 4 and reduce the opening area of the adjusting valve 30 as the input amount of the control lever 4 is increased.

The operating principles of this embodiment will now be described. Consider first the system in which the adjusting valve 30 is not provided. The system not including the adjusting valve 30 is equivalent to a conventional LS control system. More specifically, when the control lever 4 is not operated but is held in its neutral position, the flow control valves 3*a*, 3*b* are also in their neutral positions and the pilot line 107 is communicates with the reservoir through the shuttle valve 6 and the flow control valves 3*a*, 3*b*. At this time, since the delivery pressure of the hydraulic pump 1 acts on the unloading valve 7 through the pilot line 106, the unloading valve 107 is shifted to its closed position against the urging force of the spring 7*a*. Therefore, the control pressure generated upstream of the fixed restrictor 8 is raised, whereupon the pump control means constituted by the control processing function 37 of the controller 10 and the regulator 9 diminishes the tilting angle of the swash plate of the hydraulic pump 1 and reduces the pump delivery rate. As a result, the system is controlled such that the tilting angle of the hydraulic pump 1 is kept at minimum and the hydraulic pump 1 provides a minimum delivery rate.

When the control lever 4 is operated in the positive X-direction, for example, from the neutral position, the flow control valve 3*a* is opened to have an opening area corresponding to the input amount (demanded flow rate) L, whereupon the hydraulic fluid from the hydraulic pump 1 is supplied to the hydraulic actuator 2*a* through the flow control valve 3*a*. Simultaneously, a load pressure of the hydraulic actuator 2*a* is detected as the maximum load pressure by the shuttle valve 6, and the detected maximum load pressure acts on the unloading valve 7 along with the delivery pressure of the hydraulic pump 1. At this time, when the delivery rate of the hydraulic pump 1 is smaller than the demanded flow rate, the pump delivery pressure does not rise so that the differential pressure between the pump delivery pressure and the maximum load pressure, i.e., the LS differential pressure, becomes smaller than a predetermined value set by the spring 7*a* (hereinafter referred to as a set differential pressure of the unloading valve 7), thereby closing the unloading valve 7. Accordingly, the control pressure generated upstream of the fixed resistor 8 is lowered and the pump delivery rate is increased by the pump control means constituted by the control processing function 37 of the controller 10 and the regulator 9. When the delivery rate of the hydraulic pump 1 is increased above the demanded flow rate, the pump delivery pressure rises so that the LS differential pressure becomes larger than the set differential pressure of the unloading valve 7, thereby opening the unloading valve 7. Accordingly, the control pressure generated upstream of the fixed restrictor 8 is raised and the pump delivery rate is decreased by the pump control means. Thus, the pump delivery rate is controlled so that the pump delivery pressure is held higher than the maximum load pressure by a fixed value.

Figure 9:
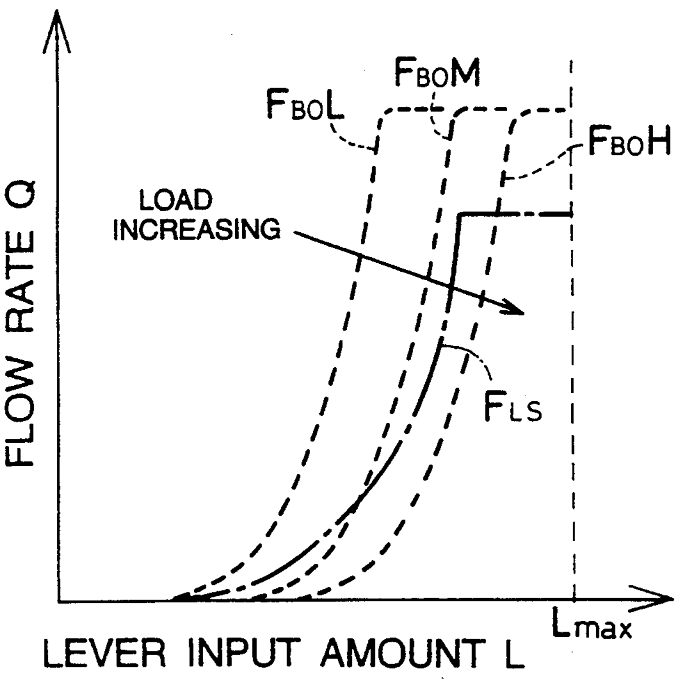
FIG. 9 is a graph showing a flow rate characteristic of LS control through an unloading valve and flow rate characteristics of bleed-off control through the adjusting valve in the hydraulic drive system of FIG. 1.

The relationship of a flow rate Q through the flow control valve 3*a* versus the input amount L of the control lever 4 which results when the delivery rate of the hydraulic pump 1 is controlled, as mentioned above, is given by a characteristic $F_{LS}$ in FIG. 9 in conformity with the relationship between the input amount L and the opening area A shown in FIG. 4. More specifically, since the pump delivery rate is controlled so that the pump delivery pressure is held higher than the maximum load pressure by the fixed value, the differential pressure between the pump delivery pressure and the maximum load pressure, i.e., the LS differential pressure, is kept constant, and the differential pressure across the flow control valve 3*a* is held at a fixed value corresponding to the LS differential pressure, whereby the flow rate characteristic $F_{LS}$ conforms with the characteristic of the opening area A of the flow control valve 3*a*. Further, since the LS differential pressure is kept constant even with change in the load pressure of the actuator 2*a*, the flow rate characteristic $F_{LS}$ is also constant regardless of the load pressure. By the LS control, therefore, even if the load pressure of the actuator 2*a* is fluctuated, the flow rate supplied to the actuator 2*a* becomes a predetermined value corresponding to the opening area of the flow control valve 3*a* (i.e., the input amount of the control lever) and the drive speed of the actuator 2*a* is not affected by fluctuations in the load pressure, making it possible to provide precisely the actuator speed depending on the input amount of the control lever.

Consider now the system of this embodiment in which the unloading valve 7 is not provided. In the system without the unloading valve 7, flow rate control is performed under the bleed-off control through the adjusting valve 30. More specifically, when the control lever 4 is initially in the neutral position, the adjusting valve 30 is opened with its maximum opening area in accordance with the characteristic shown in FIG. 8, whereby the hydraulic fluid delivered from the hydraulic pump 1 is discharged to the bleed line 105 through the adjusting valve 30. Therefore, since the control pressure generated upstream of the fixed restrictor 8 is raised, the tilting angle of the hydraulic pump 1 is kept at a minimum and the hydraulic pump 1 provides a minimum delivery rate as with the foregoing operation in the case of including the unloading valve 7 only.

When the control lever 4 is operated in the positive X-direction, for example, from the neutral position, the flow control valve 3*a* is opened to have an opening area corresponding to the input amount (demanded flow rate) L and, simultaneously, the opening area of the adjusting valve 30 is diminished depending on the input amount L in accordance with the characteristic shown in FIG. 8, thereby reducing the bleed rate that is discharged to the bleed line 105 through the adjusting valve 30. Therefore, the control pressure generated upstream of the fixed restrictor 8 is lowered and the pump delivery rate is controlled to increase by the pump control means constituted by the control processing function 37 of the controller 10 and the regulator 9. When the delivery rate of the hydraulic pump 1 is increased to make the pump delivery pressure higher than the load pressure of the actuator 2*a*, the hydraulic fluid from the hydraulic pump 1 starts to be supplied to the hydraulic actuator 2*a* through the flow control valve 3*a*. On the other hand, as the delivery rate of the hydraulic pump 1 is increased and the pump delivery pressure becomes higher, the bleed rate discharging through the adjusting valve 30 increases and the control pressure generated upstream of the fixed restrictor 8 rises. When the pump delivery rate determined by the generated control pressure is balanced with the total of the flow rate supplied to the actuator 2*a* and the bleed rate discharging through the adjusting valve 30, the control pressure is stabilized and the delivery rate of the hydraulic pump 1 is kept constant. As this time, on condition that the load pressure of the actuator 2*a* is constant, since the flow rate discharging through the adjusting valve 30 is smaller at the larger input amount L of the control lever 4 in accordance with the characteristic shown in FIG. 8, the control pressure is stabilized at a lower value and the delivery rate of the hydraulic pump 1 established when the control pressure is stabilized becomes larger, as the input amount of the control lever 4 increases. Thus, the delivery rate of the hydraulic pump 1 is controlled depending on the input amount L of the control lever 4.

On the other hand, the actuator 2*a* is supplied through the flow control valve 3*a* with the hydraulic fluid at a flow rate that is determined by subtracting the bleed rate through the adjusting valve 30 from the delivery rate of the hydraulic pump 1. The relationship of the flow rate Q through the flow control valve 3*a* versus the input amount L of the control lever 4 in this case is given by characteristics $F_{BO}L$, $F_{BO}M$, $F_{BO}H$ in FIG. 9 in conformity with the relationship between the input amount L and the opening area A shown in FIG. 8. Specifically, the flow rate is affected by the load pressure in this case such that the bleed rate through the adjusting valve 30 is increased at the larger load pressure and the flow rate through the flow control valve 3*a* is reduced even with the same pump delivery rate. With an increase in the load pressure, therefore, the characteristic of the flow rate Q through the flow control valve 3*a* changes as indicated by $F_{BO}L$, $F_{BO}M$, $F_{BO}H$ in the direction the flow rate Q reduces.

It should be noted that the flow rate control through the adjusting valve 30 in this embodiment is similar to bleed-off control in the conventional system provided with a center-open flow control valve and, in this sense, the flow rate control through the adjusting valve 30 is called bleed-off control in this description.

This embodiment includes both the unloading valve 7 and the adjusting valve 30, the adjusting valve 30 being disposed in parallel to the unloading valve 7 and upstream of the fixed restrictor 8. Therefore, when the differential pressure between the delivery pressure of the hydraulic pump 1 and the maximum load pressure (i.e., the LS differential pressure) is not larger than the set differential pressure of the unloading valve 7, the unloading valve 7 is closed, resulting in a system which is equivalent to the system without the unloading valve 7 and in which the bleed-off control through the adjusting valve 30 is performed. When the LS differential pressure is larger than the set differential pressure of the unloading valve 7, the hydraulic fluid is discharged through the unloading valve 7, resulting in a system which is equivalent to the system without the adjusting valve 30 and in which the LS control through the unloading valve 7 is performed.

Additionally, when the control lever 4 is in the neutral position, the adjusting valve 30 is opened with the maximum opening area and the hydraulic pump 1 is controlled so as to keep the tilting angle at a minimum, thereby providing the minimum delivery rate.

Figure 10A:
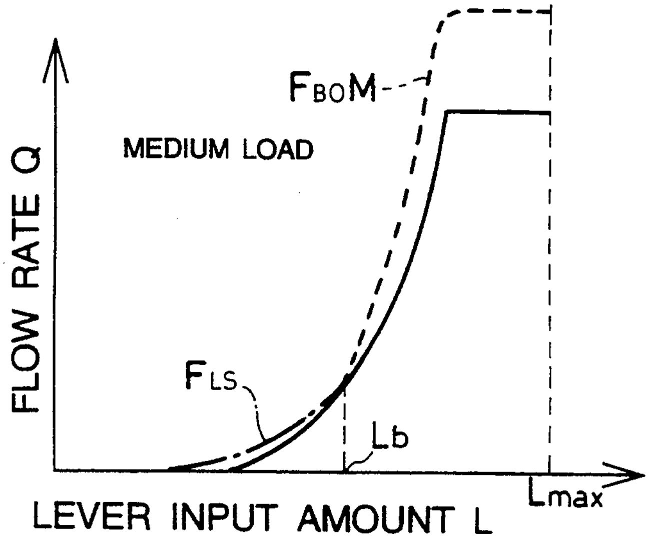
FIG. 10(A) shows the flow rate characteristic when the load pressure is medium.
Figure 10B:
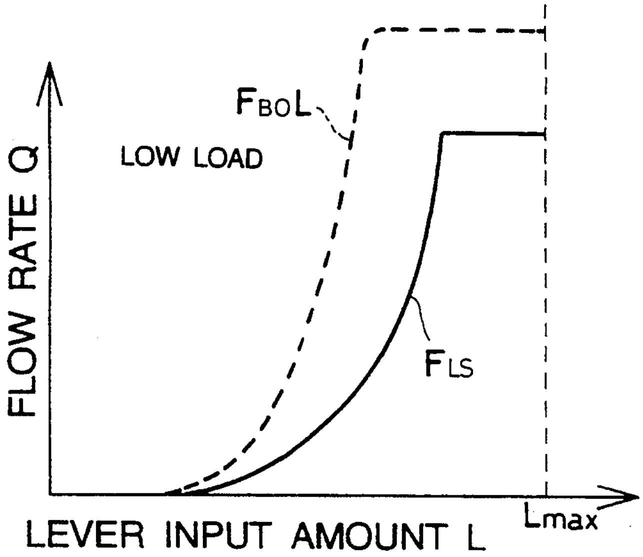
FIG. 10(B) shows the flow rate characteristic when it is low.
Figure 10C:
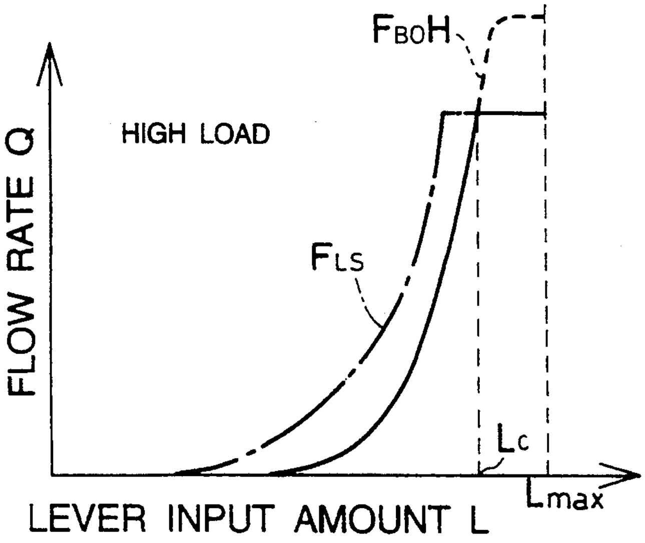
FIG. 10(C) shows the flow rate characteristic when it is high.

FIG. 10 shows the relationship between the flow rate Q through the flow control valve 3*a* and the input amount L of the control lever 4 in this embodiment. In the graph of FIG. 10, the same characteristic curves as those shown in FIG. 9 are denoted by the same reference characters. FIG. 10(A) shows the relationship that results when the load pressure of the actuator 2*a* is medium, FIG. 10(B) shows the relationship that results when the load pressure of the actuator 2*a* is low, and FIG. 10(C) shows the relationship that results when the load pressure of the actuator 2*a* is high.

On condition that the load pressure is medium, when the input amount L of the control lever 4 is not larger than Lb in a metering region, the LS differential pressure is smaller than the set differential pressure of the un-loading valve 7 and the unloading valve 7 is closed. Therefore, the bleed-off control through the adjusting valve 30 is selected. When the input amount L of the control lever 4 is increased above Lb, the LS differential pressure becomes larger than the set differential pressure of the unloading valve 7 and the unloading valve 7 is opened. Therefore, the LS control through the unloading valve 7 is selected. As a result, the flow rate characteristic in this case is provided by a solid line, shown in FIG. 10(A), representing the characteristic curve $F_{LS}$ or $F_{BO}M$ which exhibits the smaller flow rate in respective ranges on both sides of Lb.

On condition that the load pressure is low, the LS differential pressure is larger than the set differential pressure of the unloading valve 7 all over the range of the input amount L of the control lever 4 and, therefore, the LS control through the unloading valve 7 is selected. As a result, the flow rate characteristic in this case is provided by a solid line, shown in FIG. 10(B), which is the same as the characteristic curve $F_{LS}$.

On condition that the load pressure is high, when the input amount L of the control lever 4 is not larger than Lc beyond the metering region, the LS differential pressure is smaller than the set differential pressure of the unloading valve 7, and the bleed-off control through the adjusting valve 30 is selected. When the input amount L of the control lever 4 is increased above Lc, the LS differential pressure becomes larger than the set differential pressure of the unloading valve 7 and the LS control through the unloading valve 7 is selected. As a result, the flow rate characteristic in this case is provided by a solid line representing the characteristic curve $F_{LS}$ or $F_{BO}H$ which exhibits the smaller flow rate in respective ranges on both sides of Lc.

In this embodiment with the operating principles as explained above, when the control lever 4 is finely operated in a range not larger than the input amount Lb in the characteristic of FIG. 10(A) representing the medium load pressure as experienced, for example, in ground leveling work by a hydraulic excavator, the bleed-off control through the adjusting valve 30 is selected. Also, when the control lever 4 is operated within the metering region in the characteristic of FIG. 10(C) representing the high load pressure as experienced, for example, in loading work by a hydraulic excavator, the bleed-off control through the adjusting valve 30 is selected, In these cases, when the control lever 4 is operated in the positive X-direction, the delivery rate of the hydraulic pump 1 is increased depending on the input amount of the control lever 4 and the flow rate corresponding to the input amount of the control lever 4 is supplied to the actuator 2*a*, as described above.

Meanwhile, in the bleed-off control, when the delivery pressure of the hydraulic pump 1 starts rising at start-up of the actuator or upon fluctuation in the load, a part of the pump delivery rate is discharged to the reservoir through the adjusting valve 30 and the bleed line 105. Therefore, an abrupt rise in the pump delivery pressure is suppressed. The flow rate discharging to the reservoir is reduced with the larger input amount of the control lever 4. As a result, an acceleration and a drive force of the actuator 2*a* are controlled depending on the input amount of the control lever 4, enabling work to be smoothly carried out with less shock.

Further, in the characteristic of FIG. 10(C) representing the high load pressure, when the control lever 4 is quickly operated through a half stroke for starting up the actuator 2*a*, or when it is quickly returned from the full-stroke position to the half-stroke position, the actuator 2*a* generates vibration due to the abrupt change in the actuator speed. Studies conducted by the inventors indicate that if the flow rate supplied to an actuator is constant regardless of an actuator pressure, the vibration once generated on the actuator will not damp. To damp the vibration once generated, the system is required to have such a characteristic that the flow rate supplied to the actuator is reduced when the actuator pressure increases.

In the bleed-off control, as the load pressure of the actuator becomes higher, a part of the pump delivery rate which is discharged to the reservoir through the adjusting valve 30 and the bleed line 105 is increased, while the flow rate distributed for supply to the actuator is reduced, whereby the control pressure upstream of the fixed restrictor 8 rises and the pump delivery rate itself decreases. Thus, under the bleed-off control, the flow rate supplied to the actuator is reduced when the load pressure of the actuator increases. Therefore, the vibration generated on the actuator 2*a* is easily damped and the flow rate control can be performed in a stable manner without causing hunting.

On the other hand, when the control lever 4 is operated in a range not less than the input amount Lb in the characteristic of FIG. 10(A) representing the medium load pressure as experienced, for example, in medium digging work by a hydraulic excavator, or when the control lever 4 is operated within a full-stroke region in the characteristic of FIG. 10(C) representing high load pressure as experienced, for example, in heavy digging work by a hydraulic excavator, the LS control through the unloading valve 7 is selected. In this case, when the control lever 4 is operated in the positive X-direction, the delivery rate of the hydraulic pump 1 is increased depending on the input amount of the control lever 4 and the flow rate corresponding to the input amount of the control lever 4 is supplied to the actuator 2*a*, as mentioned above. At this time, since the LS differential pressure is kept constant, the flow rate supplied to the actuator 2*a* becomes a predetermined value corresponding to the opening area of the flow control valve 3*a* (i.e., the input amount of the control lever) even with the load pressure of the actuator 2*a* fluctuated. Accordingly, the drive speed of the actuator 2*a* is not affected by fluctuations in the load pressure, making it possible to provide precisely the actuator speed depending on the input amount of the control lever 4.

Further, when the control lever 4 is operated following the characteristic of FIG. 10(B) representing the low load pressure, the LS control through the unloading valve 7 is selected all over the range of the input amount of the control lever 4. As a result, the actuator speed can be controlled precisely depending on the input amount of the control lever without being affected by fluctuations in the load pressure.

While the above description is made as to operating the control lever 4 in the positive X-direction, it also equally applies to the case of operating the control lever 4 in the negative X-direction, and the case of operating control lever 4 in the positive or negative Y-direction to drive the actuator 2*b*.

Consequently, with this embodiment, the LS control through the unloading valve 7 and the bleed-off control through the adjusting valve 10 are selectively performed depending on the input amount of the control lever 4, so that the flow rate control can be implemented by utilizing characteristics of both control modes.

Also, when the input amount of the control lever 4 is in a particular range and the bleed-off control through the adjusting valve 30 is selected, an acceleration and a drive force of each actuator 2*a*, 2*b* can be controlled depending on the input amount of the control lever 4 and an ability of damping vibration of each actuator 2*a*, 2*b* is improved, and when the input amount of the control lever 4 is in another range and the LS control through the unloading valve 7 is selected, the drive speed of each actuator 2*a*, 2*b* can be controlled precisely depending on the input amount of the control lever.

Figure 11:
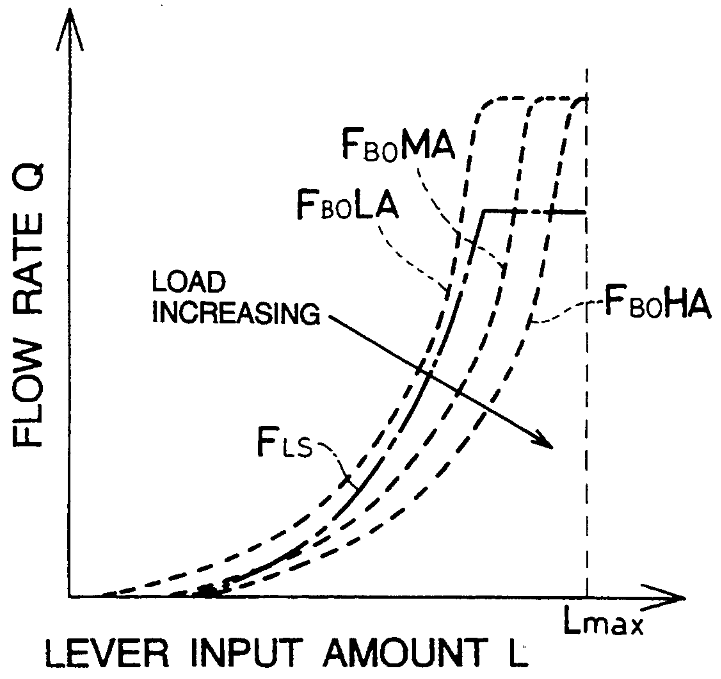
FIG. 11 is a graph similar to FIG. 9, showing flow rate characteristics in a modification.
Figure 12A:
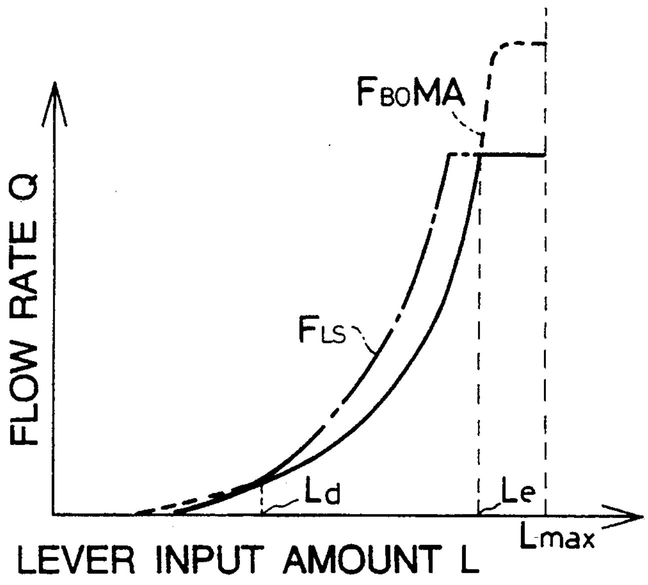
FIG. 12(A) shows the flow rate characteristic when the load pressure is medium.
Figure 12B:
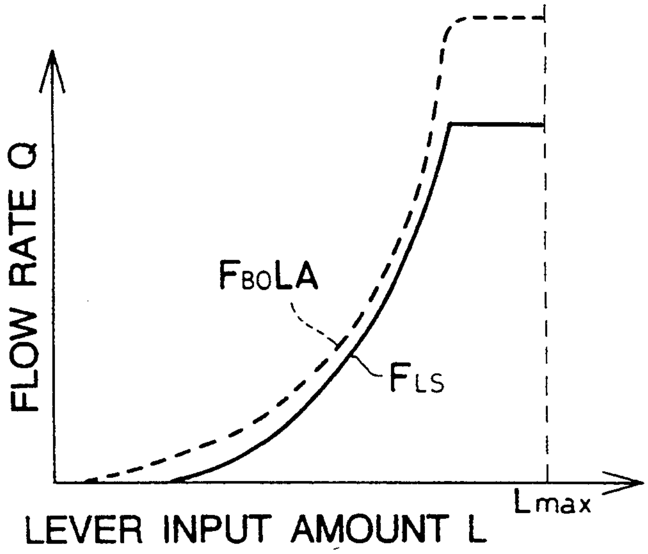
FIG. 12(B) shows the flow rate characteristic when it is low.
Figure 12C:
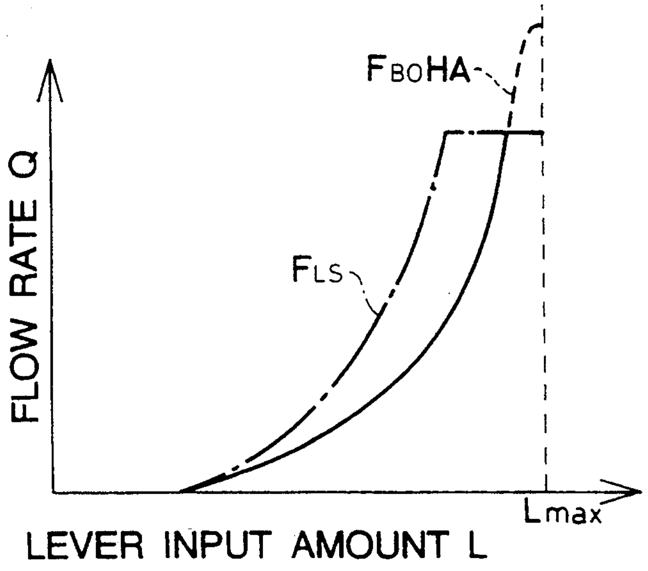
FIG. 12(C) shows the flow rate characteristic when it is high.

In the above embodiment, the characteristics $F_{LS}$, $F_{BO}L$, $F_{BO}M$, $F_{BO}H$ of the flow rate Q versus the input amount L of the control lever shown in FIG. 9 can be variously modified by changing the characteristic of the opening area of each flow control valve 3*a*, 3*b* shown in FIG. 4 and/or the characteristic of the opening area of the adjusting valve 30 shown in FIG. 8. By modifying the flow rate characteristics $F_{LS}$, $F_{BO}L$, $F_{BO}M$, $F_{BO}H$ the respective combined flow rate characteristics shown in FIG. 10 can be changed. FIGS. 11 and 12 show one example of such a change in which the flow rate characteristic $F_{LS}$ for the LS control is the same as that in the above embodiment, but the flow rate characteristics for the bleed-off control are modified as indicated by $F_{BO}LA$, $F_{BO}MA$, $F_{BO}HA$. In this case, the combined flow rate characteristics are as indicated in FIGS. 12(A) to 12(C) depending on the load pressure. As seen from FIG. 12(A), in the flow rate characteristic representing the medium load pressure, the LS control is selected when the input amount L is not larger than Ld within a metering region, the bleed-off control is selected when the input amount L is in the range from Ld to Le beyond the metering region, and the LS control is selected again when the input amount L is not less than Le. By so changing the flow rate characteristic, it is possible to set the characteristic advantageously for a specific purpose and hence improve operability remarkably.

Figure 13:
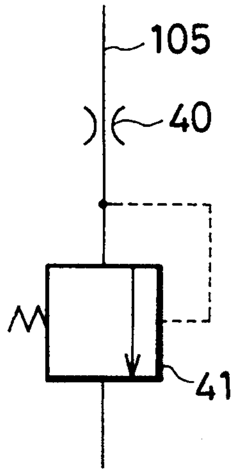
FIG. 13 is a representation showing another example of a resisting device.

In the above embodiment, the fixed restrictor 8 is provided as a resisting device for generating a pressure corresponding to the flow rate of the hydraulic fluid discharging through the unloading valve 7. As shown in FIG. 13, the resisting device may be a combination of a fixed restrictor 40 and a relief valve 41.

Figure 14:
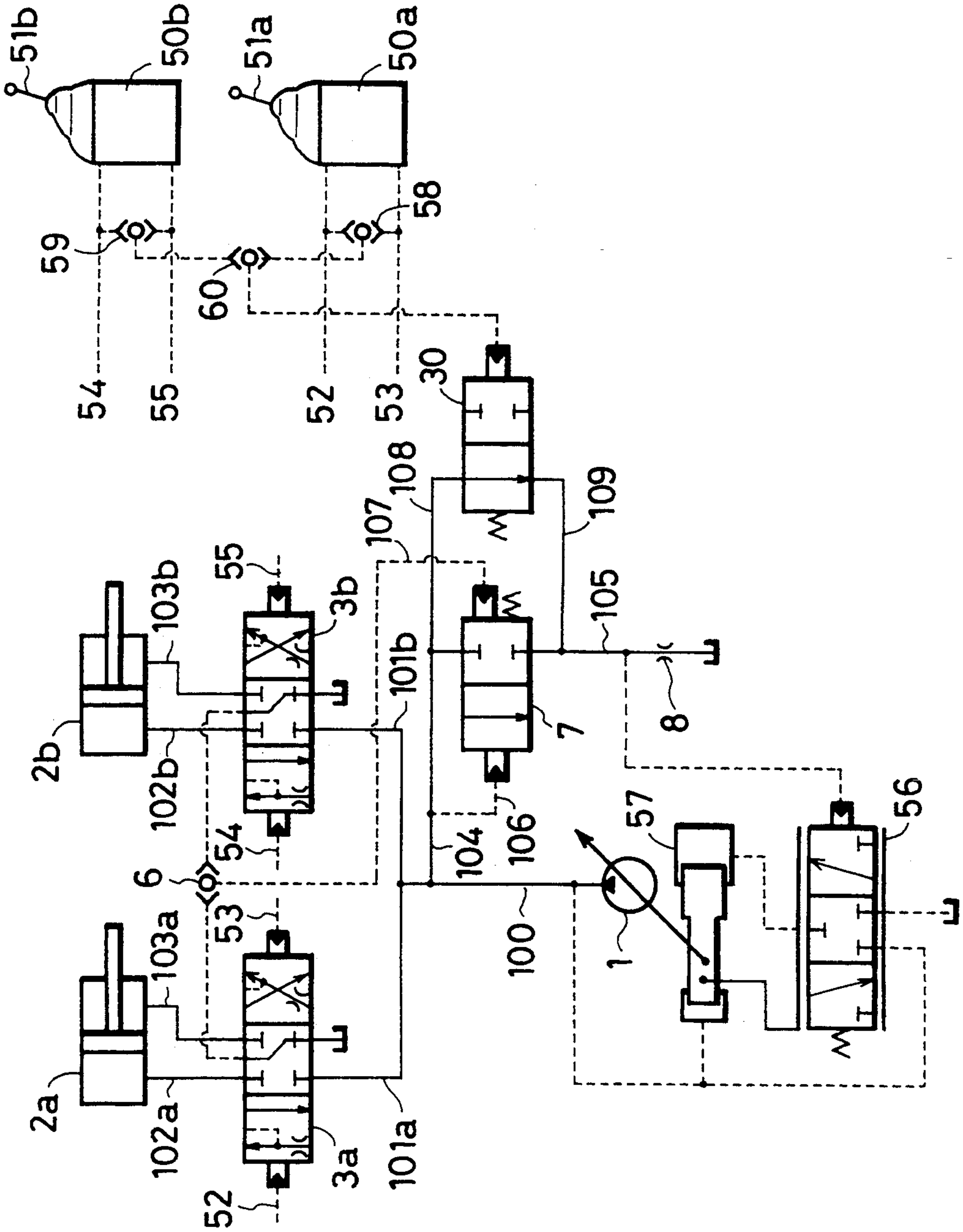
FIG. 14 is a schematic diagram showing a hydraulic drive system according to a second embodiment of the present invention.

A second embodiment of the present invention will be described with reference to FIG. 14. In FIG. 14, those members which are identical to those shown in FIG. 1 are denoted by the same reference numerals.

In this second embodiment, the control lever unit for operating the actuators *2a*, *2b* comprises two hydraulic pilot-operated control lever units 50*a*, 50*b*. Pilot pressures generated upon control levers 51*a*, 51*b* of the control lever units 50*a*, 50*b* being operated are applied to corresponding pressure receiving chambers of the flow control valves *3a*, *3b* through a pilot line 52 or 53 and a pilot line 54 or 55, respectively, thereby shifting the flow control valves *3a*, *3b*.

Also, the regulator for controlling the tilting angle of the hydraulic pump 1 is constituted by a servo control valve 56 directly subjected to the control pressure generated upstream of the fixed restrictor 8 and operated depending on the generated control pressure, and a control actuator 57 in communication with the servo control valve 56 for controlling the tilting angle of the hydraulic pump 1. The servo control valve 56 and the control actuator 57 cooperate such that the delivery rate of the hydraulic pump 1 decreases as the control pressure generated by the fixed restrictor 8 is raised, and the pump delivery rate increases as the control pressure is lowered.

Further, in this second embodiment, a control means for the adjusting valve 30 is hydraulically constructed. More specifically, the control means for the adjusting valve 30 comprises a first shuttle valve 58 for selectively taking out the pilot pressure generated in the pilot line 52 or 53, a second shuttle valve 59 for selectively taking out the pilot pressure generated in the pilot line 54 or 55, and a third shuttle valve 60 for selectively taking out the higher one of the pilot pressures taken out by the first and second shuttle valves 58, 59. In this case, the adjusting valve 30 is controlled by the pilot pressure taken out by the third shuttle valve 60 to provide the relationship of the opening area A versus the input amount L of the control lever 51*a* or 51*b*, for example, as shown in FIG. 8. Thus, the adjusting valve 30 is controlled to have the large opening area A when the input amount L of the control lever 51*a* or 51*b* is small, and to have the smaller opening area A when the input amount L is increased.

This second embodiment thus arranged can also provide similar advantages to those in the above first embodiment, because the adjusting valve 30 is opened depending on the input amounts of the control levers 51*a*, 51*b* to selectively carry out the LS control and the bleed-off control.

Figure 15:
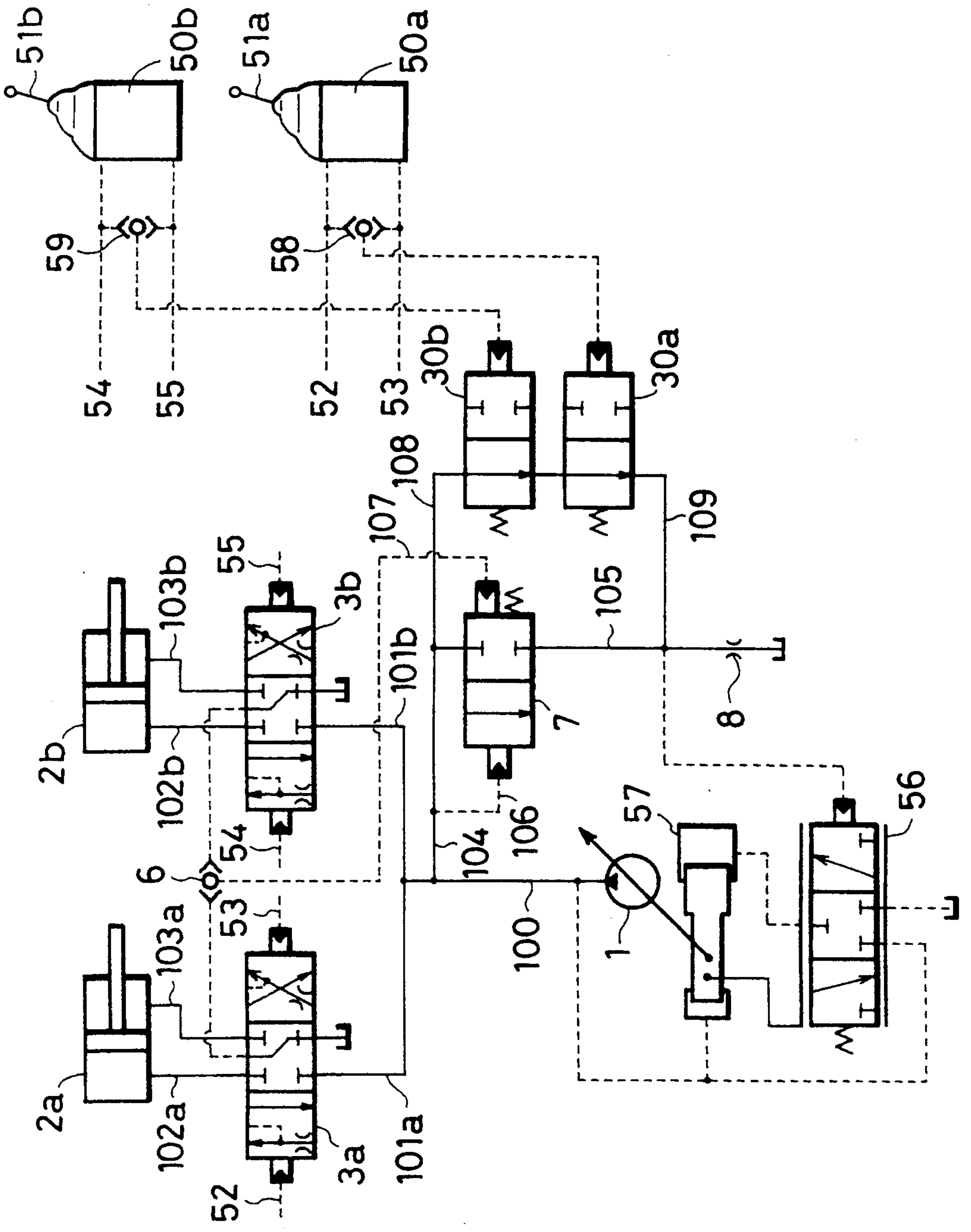
FIG. 15 is a schematic diagram showing a hydraulic drive system according to a third embodiment of the present invention.

A third embodiment of the present invention will be described with reference to FIG. 15. In FIG. 15, those members which are identical to those shown in FIGS. 1 and 14 are denoted by the same reference numerals.

In this third embodiment, instead of the adjusting valve 30 in the above second embodiment, there are provided two adjusting valves 30*a*, 30*b* arranged in parallel and corresponding to the two actuators *2a*, *2b*, respectively. The pilot pressure taken out by the first shuttle valve 58 is applied to a hydraulic drive sector of the adjusting valve 30*a*, and the pilot pressure taken out by the second shuttle valve 59 is applied to a hydraulic drive sector of the adjusting valve 30*b*. Also, the relationships of opening areas of the adjusting valves 30*a*, 30*b* versus input amounts of the control levers 51*a*, 51*b* are made different between the adjusting valves 30*a* and 30*b* to be set for providing respective flow rate characteristics suitable for the associated actuators *2a*, *2b*.

In addition to providing the similar advantages to those in the above second embodiment, the third embodiment thus arranged is further advantageous in that since the adjusting valves 30*a*, 30*b* can be separately shifted depending on the respective input amounts of the control levers 51*a*, 51*b*, it is possible to modify the flow rate characteristic for each of the actuators *2a*, *2b* and to realize highly accurate actuator control.

INDUSTRIAL APPLICABILITY

According to the present invention, LS control through an unloading valve and bleed-off control through adjusting valve means are selectively performed depending on an input amount of manipulator means, so that flow rate control can be implemented by utilizing characteristics of both the control modes.

Also, when the input amount of the manipulator means is in a particular range and the bleed-off control is selected, an acceleration and a drive force of an actuator can be controlled depending on the input amount of the manipulator means, and damping of vibration of the actuator is improved. Further, when the input amount of the manipulator means is in another range and the LS control is selected, an actuator speed can be controlled precisely depending on the input amount of the manipulator means.

We claim:

1. A hydraulic drive system having a variable displacement hydraulic pump, a plurality of actuators driven by a hydraulic fluid delivered from said hydraulic pump, manipulator means manipulated by an operator for commanding operation of said plurality of actuators, a plurality of flow control valves for controlling respective flow rates of the hydraulic fluid supplied to said plurality of actuators, pressure sensor means for detecting a maximum load pressure among said plurality of actuators, an unloading valve opened when a differential pressure between a delivery pressure of said hydraulic pump and said maximum load pressure exceeds a predetermined value, for discharging a part of a flow rate of the hydraulic fluid delivered from said hydraulic pump to a reservoir, resisting means provided downstream of said unloading valve for generating a control pressure corresponding to the flow rate of the hydraulic fluid discharged through said unloading valve, and pump control means for reducing the delivery rate of said hydraulic pump as the control pressure generated by said resisting means is raised, and for increasing the pump delivery rate as the control pressure is lowered, further comprising:

adjusting valve means connected to said hydraulic pump in parallel to said unloading valve at a position upstream of said resisting means, and control means controlling said adjusting valve means such that an opening area of said adjusting valve means is large when an input amount of said manipulator means is small, and the opening area of said adjusting valve means is reduced as the input amount of said manipulator means increases.

2. A hydraulic drive system according to claim 1, wherein said adjusting valve means has an opening characteristic that the opening area is large when a valve stroke thereof is small, and the opening area is reduced as the valve stroke increases.

3. A hydraulic drive system according to claim 1, wherein said manipulator means is of an electric type outputting an electric command signal depending on the input amount thereof, said control means comprises a controller for producing an electric drive signal corresponding to the electric command signal from said manipulator means and a proportional solenoid valve driven by the electric drive signal from said controller for generating a corresponding pilot pressure, and said adjusting valve means is driven by the pilot pressure from said proportional solenoid valve to change the opening area thereof.

4. A hydraulic drive system according to claim 1, wherein said manipulator means is of a hydraulic type for generating a pilot pressure depending on the input amount thereof, said control means comprises a check valve for taking out the pilot pressure, whereby said adjusting valve means is driven by the pilot pressure taken out by said check valve to change the opening area thereof.

5. A hydraulic drive system according to claim 1, wherein said adjusting valve means comprises a single adjusting valve, and said control means controls said adjusting valve depending on the input amount of said manipulator means.

6. A hydraulic drive system according to claim 1, wherein said adjusting valve means comprises a plurality of adjusting valves respectively associated with said plurality of actuators, said plurality of adjusting valves being directly connected to upstream of said resisting means, and said control means controls, depending on the input amounts of said manipulator means, said adjusting valves associated with said actuators which are commanded in operation from said manipulator means, respectively.

7. A hydraulic drive system according to claim 1, wherein said resisting means is a fixed restrictor.

8. A hydraulic drive system according to claim 1, wherein said resisting means is a combination of a fixed restrictor and a relief valve.

9. A hydraulic drive system according to claim 1, wherein said pump control means comprises a pressure sensor for detecting the control pressure generated by said resisting means, a controller for receiving a signal from said pressure sensor, calculating a smaller target displacement volume as said control pressure is raised while calculating a larger target displacement volume as said control pressure is lowered, and outputting an electric drive signal corresponding to the calculated target displacement volume, and a regulator for controlling a displacement volume of said hydraulic pump in accordance with said electric drive signal.

10. A hydraulic drive system according to claim 1, wherein the adjusting valve means includes an adjusting valve connected to a delivery line of said hydraulic pump, such that the resisting means generates a control pressure corresponding to the flow rate of the hydraulic fluid discharged through said adjusting valve.

* * * * *